(12) United States Patent
Bernal (10) Patent No.: US 11,127,314 B2
(45) Date of Patent: Sep. 21, 2021

(54) SIMULATING HEAD ANATOMY FOR EYE SURGERY

(71) Applicant: Bioniko Consulting, LLC, Sunny Isles, FL (US)

(72) Inventor: Andres Bernal, Sunny Isles, FL (US)

(73) Assignee: Bioniko Consulting LLC, Sunny Isles, FL (US)

( * ) Notice: Subject to any disclaimer, the term of this patent is extended or adjusted under 35 U.S.C. 154(b) by 242 days.

(21) Appl. No.: 16/419,167

(22) Filed: May 22, 2019

(65) Prior Publication Data

US 2020/0372833 A1    Nov. 26, 2020

(51) Int. Cl.
    *G09B 23/34*    (2006.01)
    *G09B 23/30*    (2006.01)

(52) U.S. Cl.
    CPC ........... *G09B 23/34* (2013.01); *G09B 23/303* (2013.01)

(58) Field of Classification Search
    CPC ......... G09B 23/28; G09B 23/30; G09B 23/34
    USPC ........................................................ 434/271
    See application file for complete search history.

(56) References Cited

U.S. PATENT DOCUMENTS

| | | | | |
|---|---|---|---|---|
| 1,868,209 A * | 7/1932 | Kapernick | ............ | G09B 23/34 434/271 |
| 2,792,573 A | 5/1957 | Clarke | | |
| 4,596,528 A * | 6/1986 | Lewis | .................... | G09B 23/30 434/270 |
| 5,090,910 A * | 2/1992 | Narlo | ..................... | G09B 23/34 434/100 |
| 5,221,208 A | 6/1993 | Alexander | | |
| 5,893,719 A | 4/1999 | Radow | | |
| 6,485,142 B1 | 11/2002 | Sheehy et al. | | |
| 7,066,598 B2 | 6/2006 | Niven | | |
| 7,291,016 B2 * | 11/2007 | Otto | ....................... | G09B 23/28 434/270 |
| 7,896,653 B2 * | 3/2011 | Nylen | .................... | G09B 23/34 434/271 |
| 8,684,743 B2 * | 4/2014 | Van Dalen | ............ | G09B 23/30 434/267 |
| 8,845,334 B1 | 9/2014 | Stoll | | |

(Continued)

OTHER PUBLICATIONS

Eyecre.at—Web-site http://eyecre.atGmbH—Head 4 Eyes, practice head model product description, p. 1; retrieved May 21, 2019.

(Continued)

*Primary Examiner* — Kurt Fernstrom
(74) *Attorney, Agent, or Firm* — Fleit Intellectual Property Law; Gary S. Winer; Paul D. Bianco (57) ABSTRACT

A representation of the skull ("a mask") based upon imaging of the head enables simulation of surgical procedures. The mask is limited in extent to a zone extending above the inferior boundary of the maxilla in the axial plane, between the outer limits of the zygomatic bones in the sagittal plane, and anterior to the coronal suture of the skull in the coronal plane, and includes orbits and a nasal opening. The mask is detachably connected to a posterior base. The base includes a fluid retaining surface which forms a basin. A peripheral edge slidingly mates with a posterior portion of the mask to enable rotation of the mask. The base has a mounting surface for eye models that is posterior to each of the mask orbits. A drain port enables drainage from the base. A nasal structure resembling a nose is reversibly insertable into the nasal opening.

20 Claims, 6 Drawing Sheets

(56) References Cited

U.S. PATENT DOCUMENTS

| | | | |
|---|---|---|---|
| 9,336,692 B1* | 5/2016 | Stoll | G09B 23/28 |
| 9,437,119 B1 | 9/2016 | Bernal | |
| 9,504,925 B2* | 11/2016 | Lauer | A63H 9/00 |
| 10,410,543 B2* | 9/2019 | Gada | G09B 23/34 |
| 2009/0111081 A1 | 4/2009 | Nylen | |
| 2009/0291423 A1 | 11/2009 | Hara | |
| 2014/0038153 A1* | 2/2014 | Courtoy | G09B 23/28 |
| | | | 434/271 |
| 2014/0356836 A1* | 12/2014 | Van Dalen | G09B 23/286 |
| | | | 434/268 |
| 2015/0024364 A1* | 1/2015 | Lee | G09B 23/30 |
| | | | 434/271 |
| 2016/0063898 A1 | 3/2016 | Bernal | |
| 2016/0098944 A1 | 4/2016 | Lin | |
| 2016/0372011 A1 | 12/2016 | Bernal | |
| 2017/0229043 A1 | 8/2017 | Huh | |
| 2018/0122268 A1* | 5/2018 | Segall | G09B 23/34 |
| 2018/0290063 A1 | 10/2018 | Wang | |
| 2019/0051216 A1 | 2/2019 | Bernal | |
| 2020/0118466 A1 | 4/2020 | Bernal | |

OTHER PUBLICATIONS

GuldenOphthalmics—Web-site http://IdreesEyeSurgeryPracticeHead_ GuldenOphthalmics—Idrees Eyes Surgery Practice Head product description; p. 1; retrieved May 21, 2019.

Phillips Eye Studio—Ophthalmic Simulated Surgery—PS018 OSILA Anatomical Head; p. 1—retrieved May 21, 2019.

Web-site http://retina2020.com/detached-retina-sugery-inland-empire/—"Detached Retina Surgery Inland Empire", Retina Institute, retrieved Jul. 18, 2017.

Web-site https://fci-ophthalmics.com/products/cataract-1274/kitaro-kits—Kitaro Kits; FCI Ophthalmics—Copyright 2018—retrieved Oct. 30, 2018.

Web-site http://www.phillipsstudio.co.uk/products.htm—Ophthalmic Simulated Surgery; Phillips Studio Eye—Copyright 1995-2017—retrieved Oct. 30, 2018.

* cited by examiner

SIMULATING HEAD ANATOMY FOR EYE SURGERY

CROSS REFERENCE TO RELATED APPLICATIONS

This application is related to U.S. application Ser. No. 15/675,841 filed Aug. 14, 2017 and published as U.S. Patent Publication 2019/0051216, and U.S. application Ser. No. 16/160,021 filed Oct. 15, 2018, each entitled SIMULATING EYE SURGERY, the disclosures of each of which are hereby incorporated fully by reference herein.

FIELD OF THE DISCLOSURE

The disclosure relates to a system and method for simulating the eye, and in particular, to a physical model reflecting head and face anatomy, in addition to eye anatomy, and which can be used to simulate surgical procedures upon the eye and face.

BACKGROUND OF THE DISCLOSURE

Many surgical techniques require dexterous movement and control by the surgeon. This dexterity cannot be adequately developed by reading textbooks or watching instructional videos. Animal models or cadavers have been the default method for hands-on surgical training. Today, simple models of the eye and head are available for study or practice.

SUMMARY OF THE DISCLOSURE

In an embodiment of the disclosure, a device for simulating surgery comprises a representation of an anterior portion of the skull ("a mask") which is limited in extent to a zone extending above the inferior boundary of the maxilla in the axial plane, between sagittal planes defined by the outer limits of the zygomatic bones, and anterior to the coronal suture of the skull in the coronal plane; a detachable base positionable posteriorly to the mask and including a fluid retaining surface, a peripheral edge mateable with a posterior portion of the mask, and a mounting surface positioned proximate and posterior to each of the orbit portions of the mask.

In various embodiments thereof, the mounting surface forms a planar surface to which a suction cup of an eye model is adhered when an eye model is attached to the base; the mounting surface forming an insertion area in a surface of the base into which a portion of an eye model is inserted when an eye model is attached to the base; the insertion area includes a resilient material; the peripheral edge and the mask form mating edge and channel portions which are slidable in mating engagement relative to each other; the fluid retaining surface includes a basin, the device further including a drain port formed in the basin and extending away from the basin; and/or the mask is derived from data of a three dimensional digital image created using medical imaging of a head of an organism.

In other variations thereof, the base further includes at least one threaded aperture on a posterior facing surface of the base into which a threaded projection can be threaded to form an adjustable stand for the base, the base thereby positionable at an adjustable angle relative to a supporting surface, when the base is positioned upon a supporting surface, by changing an amount by which a threaded projection is threaded into the base; the base further including a threaded clamping aperture formed in the base to extend from a periphery of the base to an insertion area, a threaded projection threadable into the threaded clamping aperture to apply pressure to an eye model that has been inserted into the insertion area, when an eye model has been inserted into the insertion area; and/or the device further includes an orbit accessory portion positionable upon the mask to form a body tissue surface resembling soft body tissue of a head in the region of one or more eye orbits.

In still further variations thereof, the orbit accessory portion simulates an appearance of skin and underlying muscle; the orbit accessory portion simulates an appearance of at least one eyelid; the eyelid includes secretory gland ducts; and/or the orbit accessory portion includes a posteriorly extending eye orbit portion positionable about an eye model when an eye model is attached to the device.

In additional variations thereof, the drain port includes a nozzle extending from the base upon which tubing can be mounted when tubing is attached to the drain port; posterior facing surface including one or more tabs extending from a peripheral surface of the base, the one or more tabs including at least one of the at least one threaded aperture; the device further includes a light source positioned posterior to the mask when the mask is positioned upon the base; and/or the device further includes a nasal structure resembling a nose reversibly insertable into the nasal opening.

In another embodiment of the disclosure, a device for simulating surgery comprises a representation of a portion of the skull ("a mask") including portions of the frontal, zygomatic, maxilla, and nasal bones, and orbits and nasal openings; a detachable base positionable posteriorly to the mask and including a fluid retaining surface posterior to the mask and including a drain port, a peripheral edge mateable with a posterior portion of the mask, and a mounting surface positioned proximate and posterior to each of the orbit portions of the mask; and a nasal structure resembling a nose reversibly insertable into the nasal opening.

In a further embodiment of the disclosure, a method of simulating surgery comprises providing a device for simulating surgery, the device comprising a representation of the skull ("a mask") including portions of the frontal, zygomatic, maxilla, and nasal bones, and orbits and nasal openings; a detachable base positionable posteriorly to the mask and including a fluid retaining surface, a peripheral edge mateable with a posterior portion of the mask, a mounting surface positioned proximate and posterior to each of the orbit portions of the mask, and a drain port formed in the base in fluid communication with the fluid retaining surface.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION OF THE DISCLOSURE

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

The disclosure provides an ophthalmic simulation head device 100 which can be used by ophthalmic specialists and other health professionals. A base 110 supports various eye models and collects surgical fluids, and a skeleton portion or mask 200 simulates relevant bone structures of the face, which together form a realistic and compact simulation of the eye and surrounding anatomy. Device 100 provides accurate fidelity of the region while providing advanced simulation functionality described further herein.

Imaging-Based Head Features

Figures 1, 2, 3:
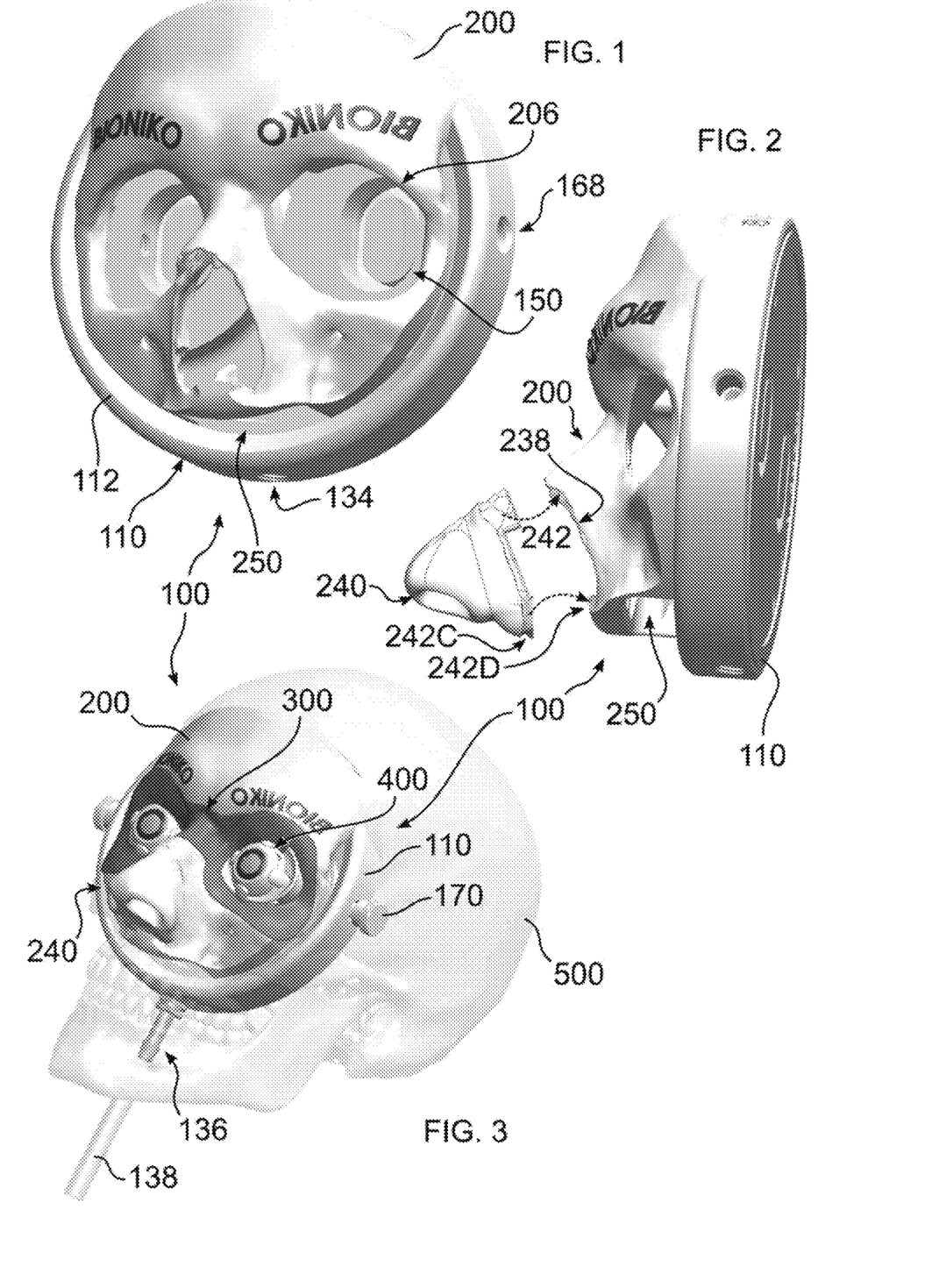
FIG. 1 depicts a front perspective view of a surgical model of the disclosure, including a mask and base.
FIG. 2 depicts a side view of the model of FIG. 1, showing a detachable nose portion.
FIG. 3 depicts the device of claim 1, further including an orbit accessory, and illustrating the entire head upon which a portion forms the basis for dimensions of the mask.

Mask 200, in an embodiment, is derived from actual CT and/or MRI data of the front of the head, thereby reflecting accurate facial contours and hard bone structures, as well as nasal and forehead soft tissue regions. FIG. 3 illustrates how mask 200 forms a segment of an entire anatomical skull 500, which is shown in transparency, to show a relationship between mask 200 and an entire head, which would typically not be included as part of device 100, as this provides a practical advantage over existing head models in portability, cost and storage volume, but which nonetheless could be included.

It should be understood that digital data from medical imaging devices cannot be read, today, directly by a 3D printer. Further effort and skill, together with the use of software is required to, for example, "segment" medical images to obtain the relevant tissues, and to then convert the 3D data into a format readable by a 3D printer. An example of one method to do this is disclosed in my U.S. Pat. No. 9,437,119, which is incorporated herein by reference.

By providing a medical image-based accurate reproduction of human facial and head anatomy, device 100 simulates negotiating facial topography as would be present during surgery. In particular, device 100 provides hand support areas as would be available during live surgery, as well as recreating relevant anatomical challenges to hand placement. By simulating only the portions of anatomy that are relevant to various eye surgeries, device 100 can be provided in a more compact and lighter weight format, which fits in the palm of a hand, and which is easier to transport to training or surgical development locations.

In an embodiment, the 3D image of the head upon which mask 200 is based is created using medical imaging of the head of a desired subject, whether of a human or other animal, and whether live or a cadaver. Such imaging can include one or more CAT scans, MRIs, X-Rays, Ultrasound images, or other imaging technique known or hereafter developed. Image data from the medical imaging may be provided in a digital or analog form. In an embodiment, digital data from the imaging device is used by a 3D printer to print mask 200, or to produce a mold for preparation of mask 200. Analog imaging data may be converted to digital form.

The digital data obtained directly or through analog conversion may be converted into a format suitable for a 3D printer, and may be edited to remove portions of the skull which are not desired to be printed. Certain skeletal features which are not desired in mask 200 can be digitally edited from the 3D printer file before printing. Other features, such as interference regions or latches for attachment of nose portion 240, a ridge 112 or channel 202 for mating engagement with base 110, formation of opening 250, removal of unneeded bone structures, or another attachment structure can be applied to the digital image before 3D printing or production by other means.

In addition to orbit 206, mask 200 includes numerous aspects of the frontal portion of the head, but may or may not include all mouth related structures, and can include a brow and frontal bone 230, zygomatic bone 232, maxilla portion 234, and nasal bone 236. Additionally, as can be seen in FIGS. 3 and 16-18, a removable nose portion 240 corresponds to nasal cartilages, and can be inserted into nasal opening 238. The disclosure thus eliminates portions of the head which do not significantly impact skill building and training related to surgeries of the face and eye. The resulting model is easier to transport, position on a working surface, and hold for demonstration, and has a lighter weight. Further, structures which are not important for the purposes of the model are removed, eliminating confusion and complexity. In an embodiment, mask 200 is limited in an extent to a zone extending above the inferior boundary of the maxilla in the axial plane, between sagittal planes defined by the outer limits of the zygomatic bones, and anterior to the coronal suture of the skull in the coronal plane.

These structures enable the practitioner to practice a temporal approach, with expected support from the forehead and cheek, a superior approach with expected support from the forehead and eye socket, and with the removable nose portion installed, nasal interference can be simulated. As such there is provided realistic attributes and constraints which relate to surgical maneuvers.

Removable Nose Portion

As can be seen in FIGS. 3 and 16-18, a removable nose portion 240 can be attached to nasal opening 238, which can be seen for example in FIGS. 1-2. Nose portion 240 can be releasably affixed to mask 200, and nasal opening 238 in particular, using adhesive, magnets, hook and loop fastener, mating tabs and latches, or an interference fit 242 (FIG. 2), for example wherein one or more interference nose parts 242A of nose portion 240 passes into nasal opening 238 and is retained against one or more interference nose opening part 242B of nasal opening 238, therein by friction. In addition or alternatively, latch portions 242C, 242D can mutually engage, as shown in FIG. 2.

Nose portion 240 is advantageously flexible and sufficiently soft to simulate natural nasal cartilage and skin, to best simulate nasal interference during eye surgery. This can be accomplished in accordance with the disclosure by forming nose portion 240 with a single material with a hardness that approximates the natural nose, or a combination of materials which approximates cartilage using a material with a first hardness, and other soft tissue with a material of a second hardness. This can be carried out, for example, by co-molding, overmolding, or 3D printing, or other means. In an embodiment, removable nose portion 240 is formed integrally with mask 200, in which case it would not be detachable.

Nose portion 240 can be provided within interior nasal passages which resemble those of natural anatomy, and which provide ingress to medial and inferior walls of the eye socket.

In accordance with the disclosure, surgeons in training can remove nose portion 240 to reduce obstruction and facilitate gaining skill with the intended eye surgery. Once sufficient skill is achieved without nose portion 240, a more realistic scenario can be achieved by attaching nose portion 240 to enable practicing the same procedures combined with nasal obstruction to simulate full difficulty.

Fluid Collection

Figures 4, 5, 6, 7:
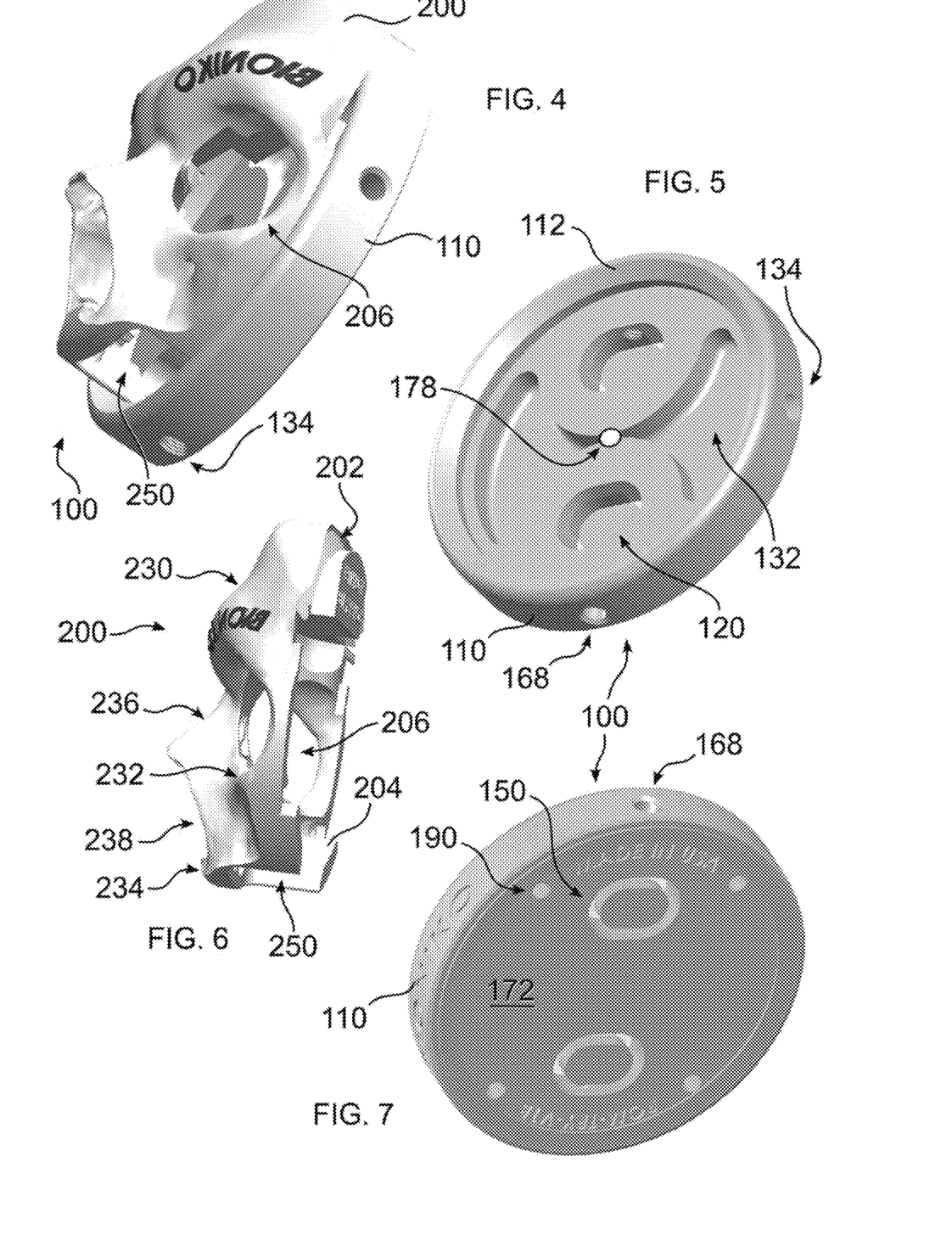
FIG. 4 depicts a side perspective view of the mask of FIG. 1.
FIG. 5 depicts a perspective view of the base of FIG. 1.
FIG. 6 depicts a side perspective view of the mask of FIG. 1.
FIG. 7 depicts a bottom view of the base of FIG. 1.
Figures 15, 16, 17, 18:
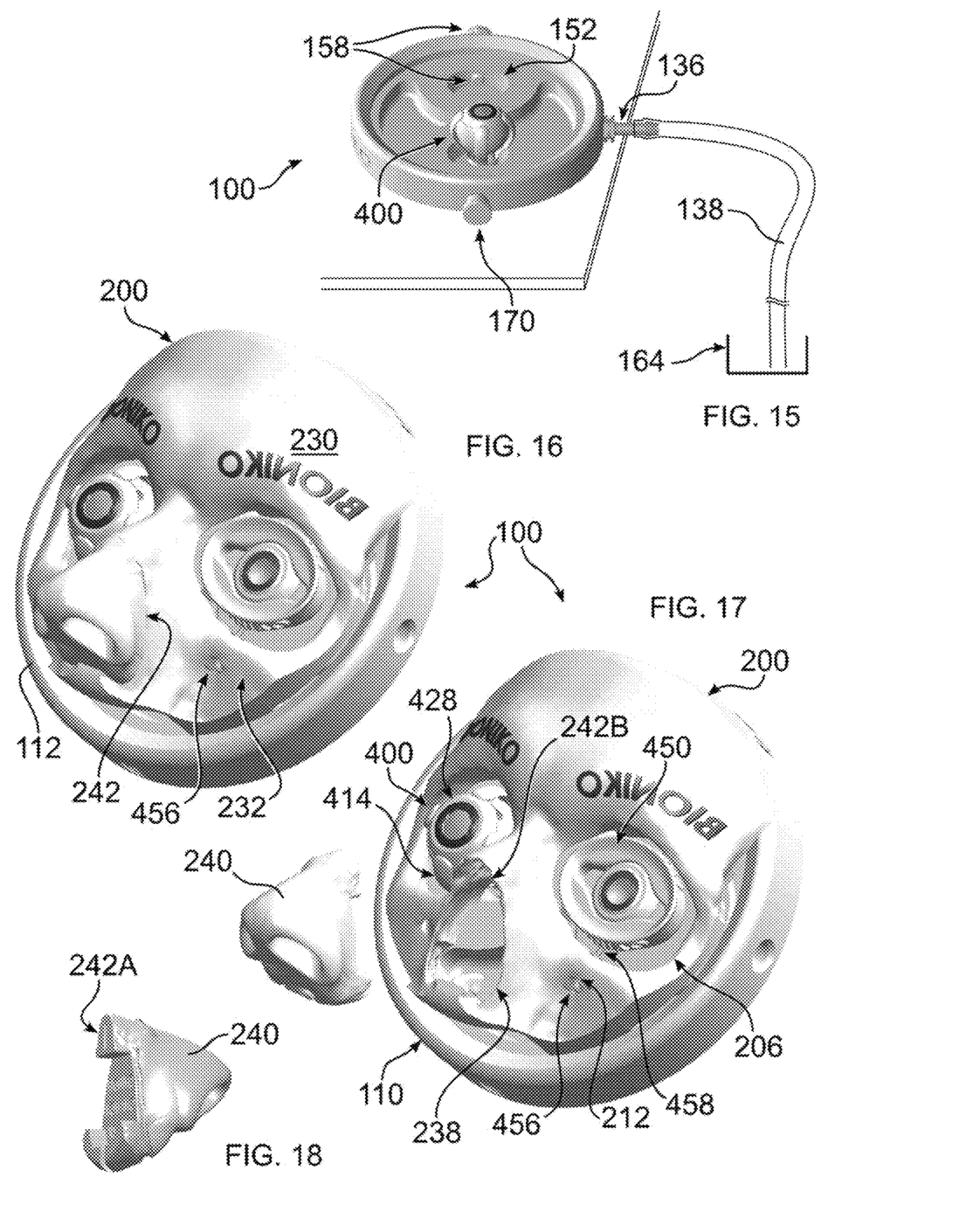
FIG. 15 depicts the base of FIG. 1, further illustrating tubing connected to a drain port, the tubing extending gravitationally lower than the base, to drain into a fluid collection vessel.
FIG. 16 depicts the device of FIG. 1, with different eye models attached to each eye orbit region.
FIG. 17 depicts the device of FIG. 16 with the nose portion removed.
FIG. 18 depicts a posterior perspective view of the removed nose portion.

With reference to FIGS. 3 and 5, base 110 forms a fluid collection trough, whereby fluids that are released into, onto, or from the eye are collected for controlled drainage. Ridge 112 forms a peripheral side wall to contain liquids, and a basin 132 forms a lowermost collection point. A drain port 134 is formed between a base of basin 132 and an exterior of base 110. In an embodiment, drain port 134 is threaded to receive a drainage nozzle 136 (FIGS. 3 and 15). With reference to FIG. 15, drainage tubing 138 can be connected to drainage nozzle 136 to guide fluids by gravity to a drain or a collection vessel 164 located downstream or below a position of device 100. While a pump can be connected to nozzle 136 or tubing 138, this should normally not be needed as basin 132 naturally drains by gravity without suction or other assist, and nozzle 136 is positioned at a base of basin 132.

As ridge 112 and basin 132 are entirely contained within the periphery of the natural dimensions of a head modelled by device 100, there is no need for placing device 100 within a collection tray or other containment, or otherwise expanding a peripheral dimension of device 100 for fluid collection. Notwithstanding the foregoing, a surgical aspirating drainage system can be used together with device 100, if desired, for additional training.

Positionable Mask

FIGS. 5-6 depict mask 200 removed from base 110. Mask 200 can be provided with a channel 202 which receives a corresponding ridge 112 on base 110, and guides which contact ridge 112, to properly orient mask 200 with respect to base 110. It should be understood, however, that base 110 can be provided with a channel, and mask 200 with a ridge. In an embodiment, base 110 and mask 200 can be rotated relative to each other by sliding ridge 112 within channel 202, while mask 200 remains engaged and in contact with base 110. Generally, however, base 110 is aligned so that eye model supports 120 are positioned proximate eye socket openings, or orbits 206, and this position can be adjusted to align the eye relative to orbit 206 as desired. Additionally, a position of drain port 134 is adjustable relative to an orientation of mask 200, and more particularly, can be rotated or flipped 180 degrees relative to mask 200 to provide superior or inferior drainage as needed or desired.

Eye Model Support

Device 100 can be used to support eye models, and particularly eye models for surgical simulation. The disclosure illustrates two such models, the FUNDUS model (FIGS. 11-12), and the OKULO model (FIGS. 13-14), both products of BIONIKO MODELS, Sunny Isles, Fla. It should be understood, however, that other eye models of Bioniko or other manufacturers can be used with device 100, provided the model can fit within the confines of a particular embodiment of device 100. The Fundus and Okulo models are detailed in incorporated U.S. Patent Publications 2019/0051216, and U.S. application Ser. No. 16/160,021.

Device 100 can support eye models that can be secured upon base 110 in any manner, including suction cup, adhesive, hook and loop fastener, or other fastening means such as screws, set-screws, bolts, snaps or other added fastener, or which may simply be confined between base 110 and mask 200. For example, two particular methods are illustrated, including a resilient insertion area 150, and a suction cup surface 160. These are illustrated in use with the aforementioned Fundus and Okulo models, however it should be understood they may be used with any other eye model known or hereafter developed which are configured in a manner which can exploit area 150 and surface 160 for attachment. In addition to attaching a manufactured model to base 110, and area 150 in particular, it is possible in accordance with the disclosure to place body tissue in these locations, for example cadaver tissue such as an eye and associated musculature. To facilitate this, area 150 can be coated with a soft natural or manufactured material, for example a layer of cork or polymer (not shown), or such layer can be adhered to area 150, into which pins or other fastener may be passed, in order to secure the biological tissue.

Fundus

Figures 11, 12, 13, 14:
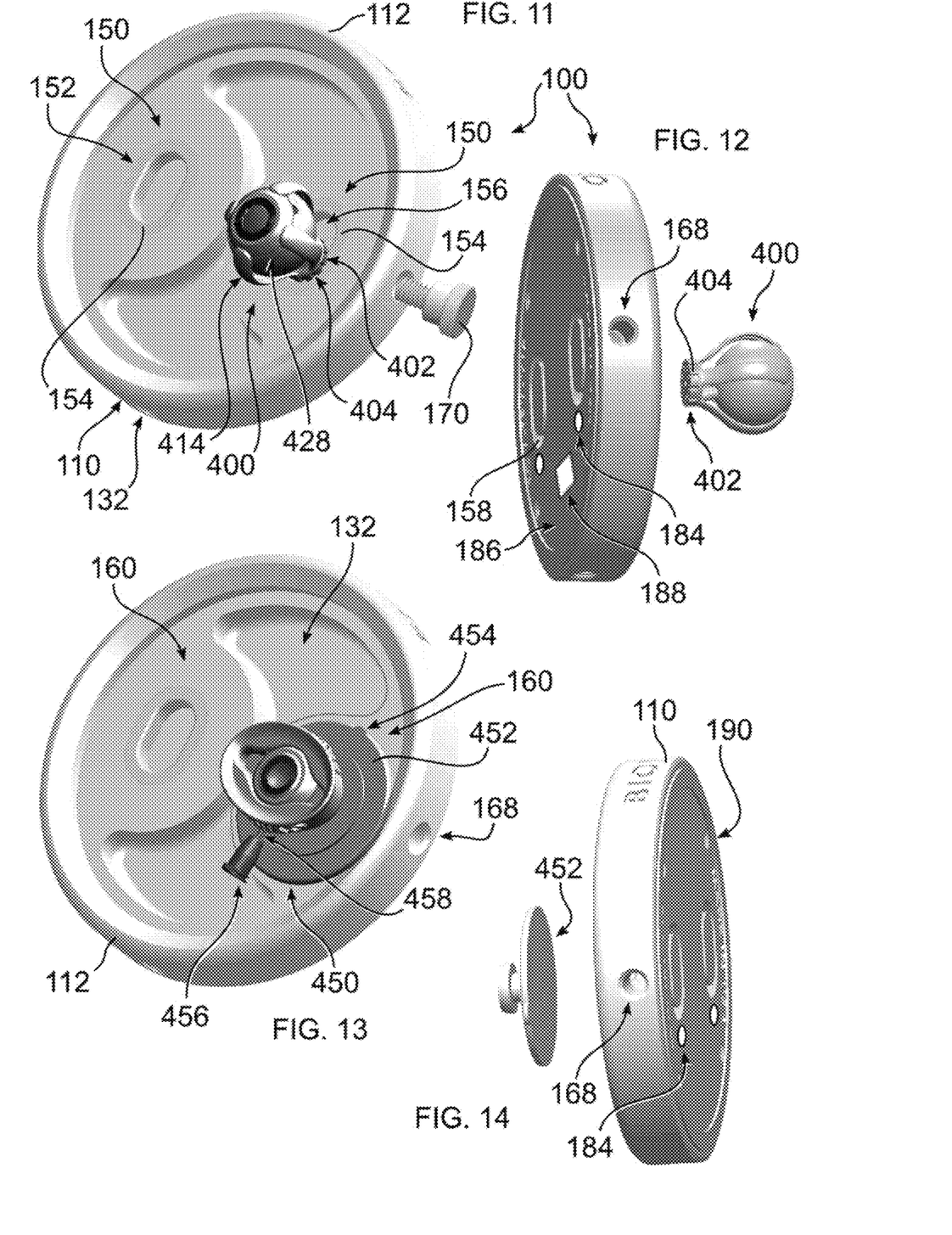
FIG. 11 depicts a front perspective view of the base of FIG. 1, further including an eye model inserted into the base.
FIG. 12 depicts a side perspective view of the base of FIG. 11, with the eye model separated from the base.
FIG. 13 depicts a front perspective view of the base of FIG. 1, with an alternative eye model adhered to the base using a suction cup.
FIG. 14 depicts a side perspective view of the base of FIG. 1, with the suction cup portion of the eye model isolated and separated from the base.

A Fundus device 400 is shown inserted into base 110 in FIG. 11, and removed in FIG. 12. A support base or insertion foot 402 of fundus device 400 is circular in exterior shape, and includes ridges 404. In FIG. 11, device 400 is inserted within insertion area 150. In the embodiment shown, area 150 includes an oval shaped opening 152, and a corresponding resilient oval shaped mounting insert 154. In turn, mounting insert 154 includes an oval shaped recess 156 that is sized to form a resilient interference fit with insertion foot 402. As such, area 150 can be fabricated with, or provided with, an elastomeric inner lining material.

The contour of insertion area 150 and an outer contour of mounting insert 154 should be complementary, but need not be oval. However, it is advantageous for mounting recess 156 to be oval, so that an inserted eye model can be moved linearly while mounted. A non-linear opening, such as an arcuate opening, can be used to enable non-linear movement. Notwithstanding this, mounting recess 156 can be circular or some other shape if movement of a mounted eye model is not needed.

Figures 8, 9, 10, 10A:
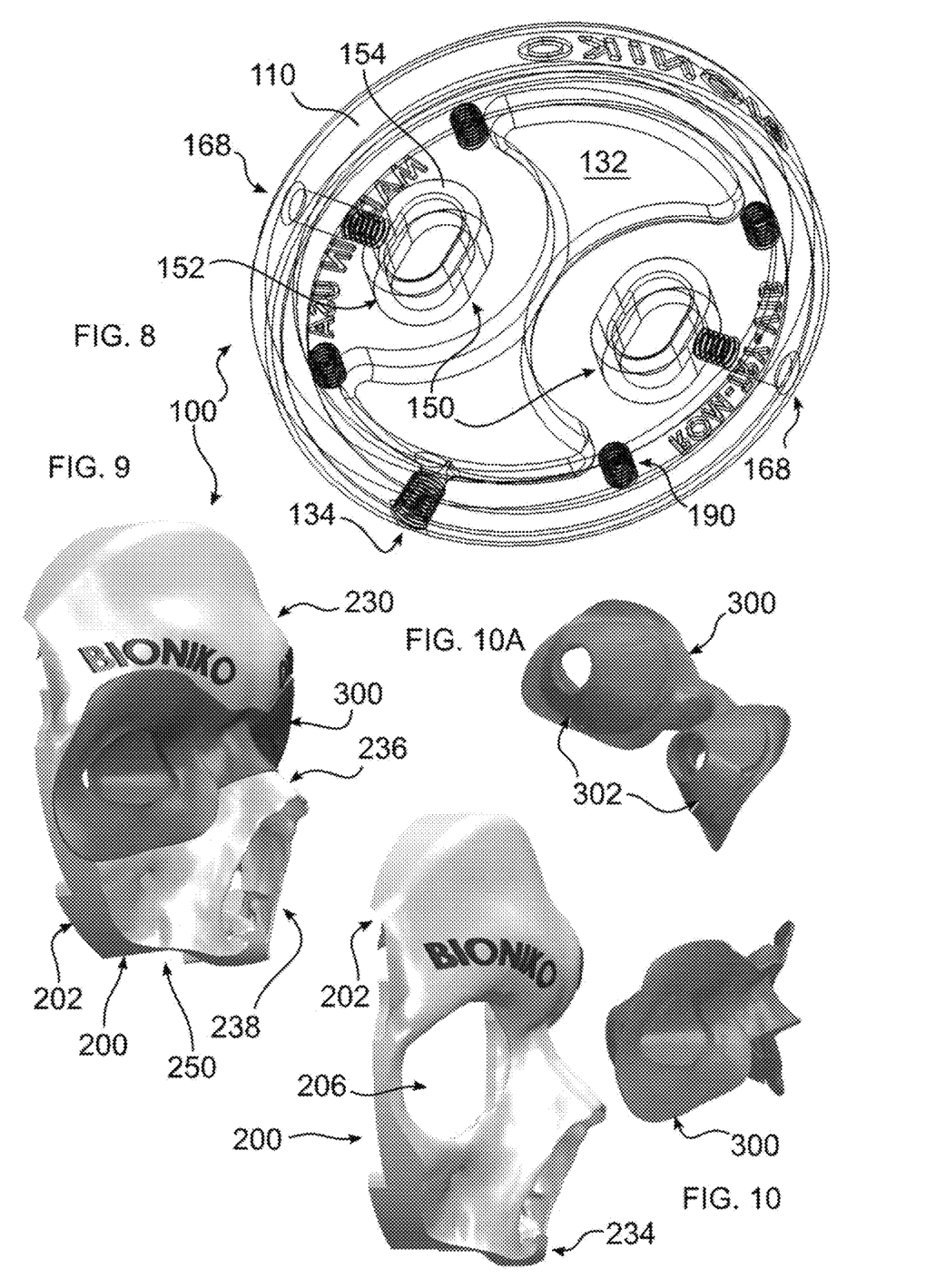
FIG. 8 depicts a wire form view of a front perspective view of the base of FIG. 1.
FIG. 9 depicts a side perspective view of the mask of FIG. 1, including an orbit accessory extending across both eye orbits.
FIG. 10 depicts the mask of FIG. 9 with the orbit accessory separated from the base.
FIG. 10A depicts a posterior view of the orbit accessory of FIG. 9.

With additional reference to FIG. 8, Mounting insert 154 can be press fit into base 110, and/or can be secured using an adhesive, or any other fastening means. Alternatively, mounting insert 154 can be co-molded with base 110, or can be fabricated with a different material than base 110 using 3D printing, for example. To maintain a function of base 110 to collect fluids which are directed to port 134, recess 156 does not extend entirely through mounting insert 154, instead forming a fluid retaining floor 158 (FIG. 12). Mounting insert 154 is transparent in the figures, facilitating visualization, although it may be transparent or opaque. When any or all of mounting insert 154, insertion foot 402, base 110, or other components of the disclosure are formed with a translucent or transparent material, retro-illumination can be carried out by placing a light source 184 on a lower surface 186 of base 110. Light source 184 can be powered by an adjacent battery 188 attached to or positioned within base 110, or can be powered by an induction configuration (not shown) or a wired connection to an external power source (not shown).

In various alternatives, base 110 can be formed from a resilient material, and as a result opening 152 can be formed directly in the material of base 110, or base 110 and opening 152 can be rigid, and insertion foot 402 can be resilient, or both base 110 and insertion foot 402 can be resilient.

The Fundus device 400 is used with respect to vitreoretinal simulation, advanced cataract, and for other procedures/skills training, although other models known or hereinafter developed which provide similar functionality, whether simulating the whole globe or a partial globe, can be used with device 100. Device 400 or other devices with a similarly shaped or sized insertion foot 402 can be mounted upon base 110. It can be advantageous to first lubricate recess 156 with water or other material, after which foot 402 is inserted in mounting in recess 156. Foot 402 can be slid inferiorly or superiorly along elongated recess 156 as desired, or in other directions depending upon an orientation of recess 156 within base 110, or an orientation of base 110 with respect to mask 200.

As shown in FIG. 11, a threaded projection, such as a thumb screw or other type of set screw 170 can be inserted into one or both of threaded apertures 168 adjacent one or both of mounting insert 154. Threaded apertures 168 extend through base 110 into oval shaped opening 152, whereby thumb screw 170 can press upon mounting insert 154 to increase pressure upon an inserted insertion foot 402, stabilizing or immobilizing an attached eye model. While a thumb screw type fastener 170 is illustrated, any threaded insert or interference fit insert can be used, which can press upon mounting insert 154 to deform insert 154 to thereby force insert 154 to press upon insertion foot 402 or other portion of an eye model inserted into insert 154. Alternatively, an opening or passage can be made through mounting insert 154 in order to enable direct contact of set screw 170 with an eye model, although this can create an undesired pathway for fluids.

The Fundus device 400 is provided with flexibility between the globe 428 portion and the foot 402, provided by rectus muscles 414, whereby the foot can be secured from movement within recess 156, yet globe 428 can be moved in a manner akin to a natural eye.

After Fundus device 400 is inserted, mask 200 is positioned over Fundus device 400 and oriented with respect to ridge 112 and base 110 as described elsewhere herein. Nose portion 240 may be attached if desired, otherwise surgical simulation can be begin once Fundus device 400 is otherwise prepared in accordance with its own specification. Fundus device 400 or other device with foot 402 can be removed by twisting and pulling away from recess 156.

In an embodiment, the elongated slot of recess 156 is positioned within base 110 so that mask 200 can be rotated 180 degrees, while the Fundus device 400 is moved from one end of the slot of recess 156 to the other, resulting in another proper orientation of Fundus device 400 with respect to mask 200, as well as a 180 degree reorientation of drain port 134.

Okulo

In FIG. 13, an Okulo device 450 is vacuum adhered to base 110 at a planar surface region 160, positioned adjacent to, and at a higher elevation than basin 132. Surface region 160 is sized to correspond to a diameter of suction cup 452 of Okulo device 450. In FIG. 14, suction cup 452 is shown without a remainder of Okulo device 450, for simplification, and to illustrate that other eye models can be provided with a suction cup 452 as illustrated, and can be releasably mounted to base 110 in a manner similar to that shown and described herein.

As can be seen in the figures, surface region 160 surrounds mounting insert 154, so that either mounting method can be used within the same location upon base 110. However, it should be understood that either mounting insert 154 or surface region 160 alone can be provided upon base 110. A release tab 454 of suction cup 452 can be pulled up to release vacuum pressure and to thereby remove suction cup 452 from surface region 160.

Okulo device 450 is provided in various forms which enable simulating cataract surgery, including capsulorhexis and phacoemulsification and anterior vitrectomy skills, as well as gonioscopy skills training and implantation of piercing-type MIGS devices, iris suturing, and other procedures and skills. It should be understood that device 100 of the disclosure can be used not only with the Okulo device, but other models known or hereinafter developed which provide similar functionality, whether simulating the whole globe or a partial globe. Device 450 or other devices with a similarly shaped or sized suction cup base can be mounted upon base 110 as described herein.

The Okulo device 450 is provided with flexibility between the globe portion and the suction cup 452, whereby suction cup 452 can be secured from movement by being pressed upon surface region 160, yet the globe portion can be moved in a manner akin to a natural eye.

After Okulo device 450 is attached, mask 200 is positioned over Okulo device 450 and oriented with respect to ridge 112 and base 110 as described elsewhere herein. Nose portion 240 may be attached if desired, otherwise surgical simulation can be begin once Okulo device 450 is otherwise prepared in accordance with its own specification. Okulo device 450 or other device with a suction cup 452 can be removed by pulling up a release tab 454.

As with the location of the elongated slot of recess 156, surface region 160 is centrally located so that mask 200 can be rotated 180 degrees to remain properly oriented with respect to a mounted eye model, while provided a 180 degree reorientation of drain port 134. In addition, surface region 160 can be formed larger than suction cup 452 so that greater freedom of positioning of suction cup 452 is possible. There are two surface regions 160, one each for the left and right eye, and they together form basin 132 into generally superior and inferior locations which are in mutual fluid communication.

Okulo device 450 or other AVH (Anterior Vitrectomy Holder) model may be provided with a syringe 456 (FIG. 13) though which the anterior chamber can be filled or drained. Such syringe 456 can be inserted before mask 200 is installed, after which the syringe can extend through an opening at a mouth region 250 (FIG. 4). Openings for syringe 456 or syringe needle 458 can be provided through mask 200 at appropriate locations, as well, for example through a portion of the orbit 212 (FIG. 17).

Tiltable Orientation

With reference to FIGS. 19-22, device 100 provides for a tilted or non-planar orientation to facilitate teaching and skill building for procedures where the head is tilted, such as during MIGS (Minimally Invasive Glaucoma Surgery) scenarios and other treatments for glaucoma. More particularly, one or more threaded projections, such as a thumb screw or other type of set screw 170B can be threaded into threaded bores 190 in bottom side 172 of base 110. As the free end of each of set screw 170B contacts a supporting surface, a relative length of each of set screw 170B which extends from base 110 determines an orientation of base 110 and thus device 100. It should be understood that set screw 170, 170B, or 170C, as described herein, can be threaded into base 110, or can be adjustably inserted using any other means, such as a friction fit or twist lock fit.

Figures 19, 20, 21, 22, 23, 24:
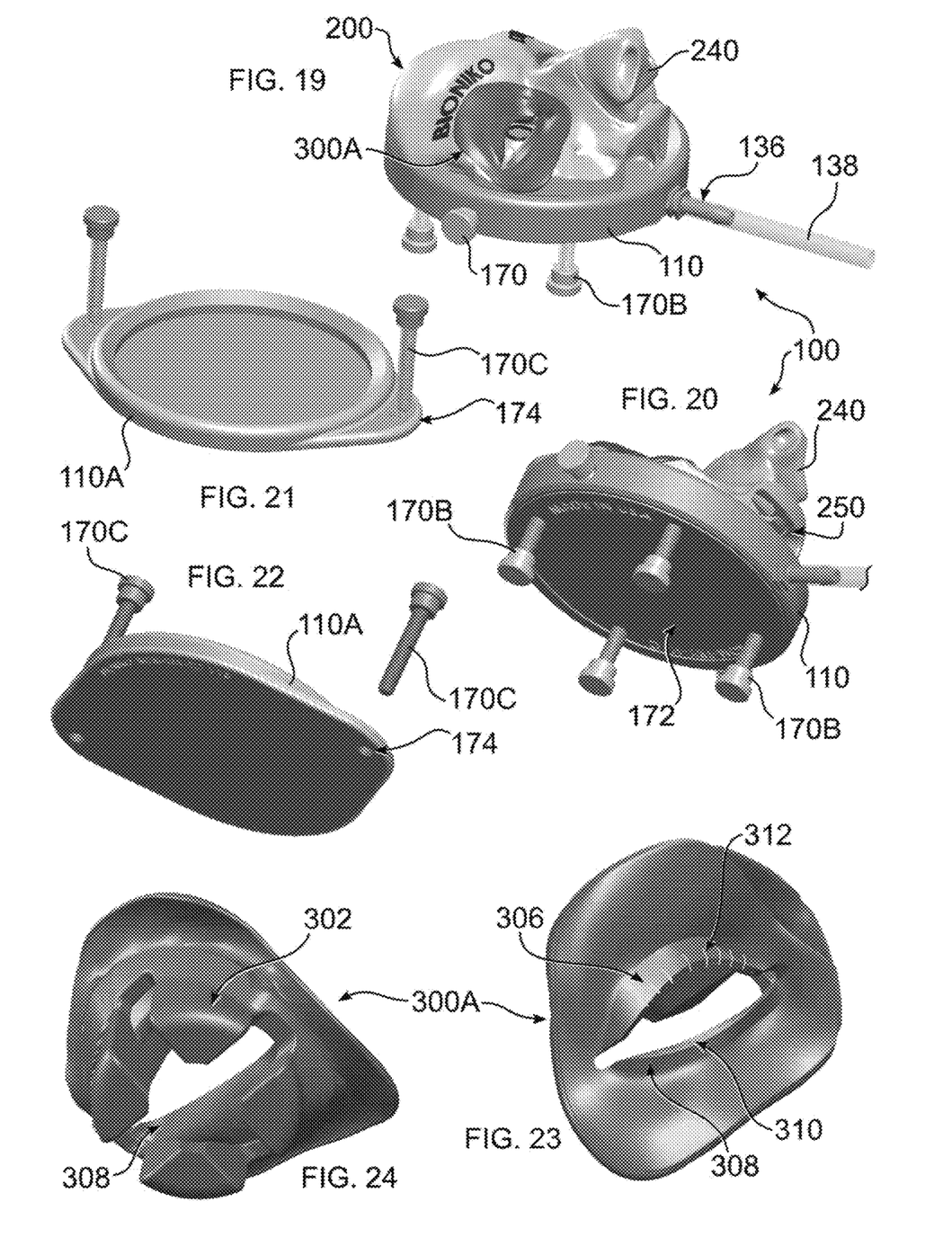
FIG. 19 depicts a side perspective view of the device of FIG. 1, further illustrating a tilting mechanism and an alternative orbit accessory including eyelids.
FIG. 20 depicts a bottom perspective view of the base of FIG. 19.
FIG. 21 depicts a top perspective view of an alternative base having an alternative tilting mechanism.
FIG. 22 depicts a bottom perspective view of the alternative base of FIG. 21.
FIG. 23 depicts an anterior perspective view of the orbit accessory of FIG. 19.
FIG. 24 depicts a posterior perspective view of the orbit accessory of FIG. 19.

In a variation thereof shown in FIGS. 21-22, alternative base 110A can be provided with extending tabs 174 including threaded apertures 176, through which set screws 170C can be passed to contact a supporting surface. A relative length of set screws 170C determines an orientation of alternative base 110A, and in turn device 100. Alternative base 110A is illustrated without basin 132, suction cup surface 160, and insertion area 150, for simplicity, and to illustrate that not all of these features are required in order to carry out the disclosure. In an embodiment, only two of set screws 170B, or one of set screw 170C can be used, for creating the largest tiltable angle.

The foregoing tilted embodiments additionally can be used to facilitate simulated scenarios of trabeculectomy, Trabecular bypass operations, totally internal or suprachor- oidal or sub-conjunctival shunts, Schlemm's canal cannulation or stenting procedures, gonioscopy assisted canaloplasty, other glaucoma related procedures, or other ocular procedures that require head tilting.

Orbit Accessory

With reference to FIGS. 9-10A, 19, and 23-24, one or more orbit accessories 300, 300A can be provided to simulate one or more of the structure of the eyelid and adjacent skin, subcutaneous tissue, orbicularis oculi, orbital septum and tarsal plates, and palpebral conjunctiva. A secretory gland opening or duct including lacrimal or meibomian gland duct openings 310 and eyelashes 312 (FIG. 23) may additionally be simulated upon the eyelid or adjacent structures. By simulating such structures, training and skill building can be carried out in procedures which are affected by the presence of these structures, or which involve these structures.

With reference to FIGS. 9-10A, a one-piece orbit accessory 300 extends across the nasal bridge to simulate the previously recited structures for both eyes. However, orbit accessory 300 does not include the eyelids. However, they may be included as shown in FIGS. 19 and 23-24, in which a single eye orbit accessory 300A includes upper and lower lids 306, 308, as well as meibomian gland duct openings 310. It should be understood, in this regard, that orbit accessory 300 or 300A can be provided to cover a single or both eyes in a manner as shown for each, respectively.

In FIGS. 9 and 23-24, it may be seen that orbit accessory 300, 300A rests within the body orbit to simulate the outermost appearance of the eye region. As can be seen in FIG. 10A for orbit accessory 300, a posteriorly extending cavity 302 forms a simulation of a natural surround for an attached eye model, for example the Fundus device 400 or Okulo device 450, described elsewhere herein. As posteriorly extending cavity 302 is flexible, the eye model can be inserted into posteriorly extending cavity 302 before or after the eye model is secured to base 110.

Additional Elements

As noted elsewhere herein, an opening at a mouth region 250 (FIGS. 1, 4, and 6) enables passage of a syringe, one or more surgical instruments, a light source, or other objects which are advantageously positioned within the interior of the portion of the head model represented by device 100. For example, a light source (not shown), such as a flashlight, may be inserted into region 250 to enable retro-illumination of an eye model attached behind mask 200, as described elsewhere herein. In an embodiment, the light emitting portion of the light source can be positioned adjacent to a posterior portion of the eye model. As device 100 and the eye models described herein may be fabricated with polymeric material which transmits light, retro-illumination of the eye and surrounding structures can be accomplished in this manner. Alternatively, a light emitting device 178 (FIG. 5), such as an LED, can be permanently or releasably attached near surface region 160 adjacent to one or both eyes. Wires connected to light emitting device 160 can be attached to or embedded within base 110, and electrically connected to a source of electrical energy, including for example a battery.

In accordance with the disclosure, device 100 forms a compact surgical simulator that benefits travelling or shipping to training events and locations, due to a very compact design which closely simulates not only the eye but the face and head features which affect training and skill development for surgical procedures upon the eye. Concomitantly, device 100 eliminates portions of the anatomy which do not affect surgical procedures upon the eye, such as anatomical features posterior to the orbit, further reducing the overall footprint of device 100.

While the disclosure emphasizes procedures upon the eye, device 100 can be used to train, educate, and demonstrate procedures, for example ENT (Ear Nose and Throat) procedures, which may be carried out on other portions of the head and face, particularly due to the close adherence to natural skeletal and soft tissue structures.

In an embodiment, device 100 is containable within a kit including one or more of a carrying case, eye models, surgical tools and supplies, drainage tubing and receptacle, a light source and batteries and/or charger, set screws, an alternative base, printed materials including instructions, and other items.

In an embodiment, device 100 has an overall assembled dimension of 5 inches long, 5 inches wide, and 3 inches high, although dimensions can vary depending upon whether the model is simulating a child or adult, and their relative sizes. These dimensions correspond with a size that can easily be held by one adult hand, for example to demonstrate or indicate various features during teaching. An example of an assembled weight in accordance with an embodiment is 0.5 pounds, although dependent on materials used (e.g. carbon fiber or metal) and the desired size (e.g. child or adult, male or female), the weight of device 100 can vary substantially, for example 0.2 pounds to 5 pounds, or outside this range.

Components of device 100 can be made of the same or different materials. The components can be formed using any known or hereinafter developed method, including molding, machining, casting, stamping, die cutting, extruding, stitching, press fitting, and 3D printing, the later using multiple materials during printing, for example. Detail regarding possible manufacturing materials and methods are described in more detail in Applicant's applications cited elsewhere herein, and in the Applicant's U.S. Pat. No. 9,437,119 and U.S. Patent Publications 2016/0372011 and 2016/0063898, all of which are incorporated herein by reference. For example, as noted in the '119 patent, rigid and elastic materials which can be used in 3D printing and other methods, and substrate materials, for example, are suggested in the incorporated references, and additional materials which are currently known or which may be hereafter introduced can be used. These and other materials can be used for producing molded parts in accordance with the disclosure, including any polymeric materials which have properties which are durable, hygienic, have proper rigidity and elasticity, and which otherwise best simulate natural body tissue as described herein.

The components of the systems and apparatuses may be integrated or separated. Moreover, the systems and apparatuses disclosed herein may be performed by more, fewer, or other components, and methods may include more, fewer, or other steps. Applicants do not intend any of the claims to invoke 35 U.S.C. 112(f) unless the words "means for" or "step for" are explicitly used in the particular claim.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

What is claimed is:

1. A device for simulating surgery in the area of the maxilla and zygomatic bones, eye orbits, nasal opening, and the coronal suture of the skull, comprising:
   a representation of an anterior portion of the skull in the form of a mask which is limited in extent to a zone extending above the inferior boundary of the maxilla in the axial plane, between sagittal planes defined by the outer limits of the zygomatic bones, and includes at least a portion of the skull anterior to the coronal suture of the skull in the coronal plane;
   a detachable base positionable posteriorly to the mask and including
      a fluid retaining surface,
      a peripheral edge mateable with a posterior portion of the mask, and
      a mounting surface positioned proximate and posterior to each of the orbit portions of the mask.

2. The device of claim 1, the mounting surface forming a planar surface to which a suction cup of an eye model is adhered when an eye model is attached to the base.

3. The device of claim 1, the mounting surface forming an insertion area in a surface of the base into which a portion of an eye model is inserted when an eye model is attached to the base.

4. The device of claim 3, wherein the insertion area includes a resilient material.

5. The device of claim 1, wherein the peripheral edge and the mask form mating edge and channel portions which are slidable in mating engagement relative to each other.

6. The device of claim 1, wherein the fluid retaining surface includes a basin, the device further including a drain port formed in the basin and extending away from the basin.

7. The device of claim 1, wherein the mask is derived from data of a three dimensional digital image created using medical imaging of a head of an organism.

8. The device of claim 1, the base further including at least one threaded aperture on a posterior facing surface of the base into which a threaded projection can be threaded to form an adjustable stand for the base, the base thereby positionable at an adjustable angle relative to a supporting surface, when the base is positioned upon a supporting surface, by changing an amount by which a threaded projection is threaded into the base.

9. The device of claim 3, the base further including a threaded clamping aperture formed in the base to extend from a periphery of the base to an insertion area, a threaded projection threadable into the threaded clamping aperture to apply pressure to an eye model that has been inserted into the insertion area, when an eye model has been inserted into the insertion area.

10. The device of claim 1, further including an orbit accessory portion positionable upon the mask to form a body tissue surface resembling soft body tissue of a head in the region of one or more eye orbits.

11. The device of claim 10, wherein the orbit accessory portion simulates an appearance of skin and underlying muscle.

12. The device of claim 10, wherein the orbit accessory portion simulates an appearance of at least one eyelid.

13. The device of claim 12, wherein an eyelid includes secretory gland ducts.

14. The device of claim 10 wherein the orbit accessory portion includes a posteriorly extending eye orbit portion positionable about an eye model when an eye model is attached to the device.

15. The device of claim 6, wherein the drain port includes a nozzle extending from the base upon which tubing can be mounted when tubing is attached to the drain port.

16. The device of claim 8, the posterior facing surface including one or more tabs extending from a peripheral surface of the base, the one or more tabs including at least one of the at least one threaded aperture.

17. The device of claim 1, further including a light source positioned posterior to the mask when the mask is positioned upon the base.

18. The device of claim 1, further including a nasal structure resembling a nose reversibly insertable into the nasal opening.

19. A device for simulating surgery within the area of the frontal, maxilla, and nasal bones, nasal structure, and nasal openings and orbits of the skull, comprising:
- a representation of the skull in the form of a mask including portions of the frontal, zygomatic, maxilla, and nasal bones, and orbits and nasal openings;
- a detachable base positionable posteriorly to the mask and including
- a fluid retaining surface posterior to the mask and including a drain port,
- a peripheral edge mateable with a posterior portion of the mask, and
- a mounting surface positioned proximate and posterior to each of the orbit portions of the mask; and
- a nasal structure resembling a nose reversibly insertable into the nasal opening.

20. A device for simulating surgery within the area of the frontal, maxilla, and nasal bones, nasal structure, and nasal openings and orbits of the skull, comprising:
- a representation of the skull in the form of a mask including portions of the frontal, zygomatic, maxilla, and nasal bones, and orbits and nasal openings;
- a detachable base positionable posteriorly to the mask and including
- a fluid retaining surface posterior to the mask and including a drain port,
- a peripheral edge mateable with a posterior portion of the mask, and
- a mounting surface positioned proximate and posterior to each of the orbit portions of the mask.

* * * * *